Patented Oct. 24, 1922.

1,433,111

UNITED STATES PATENT OFFICE.

DUDLEY P. BARNETTE, JR., OF BALTIMORE, MARYLAND.

LITHOGRAPHIC SOLUTION AND METHOD OF TREATING LITHOGRAPHIC PLATES.

No Drawing.   Application filed February 8, 1919. Serial No. 275,875.

*To all whom it may concern:*

Be it known that I, DUDLEY P. BARNETTE, Jr., a citizen of the United States, residing at 1930 W. Fayette St., Baltimore city, and State of Maryland, have invented a new and useful Improvement in Lithographic Solutions and Methods of Treating Lithographic Plates, of which the following is a specification.

The method forming the subject matter of this application refers to the art of lithography and more particularly to the preparation of lithographic printing plates, and has for its object a treatment of the plate which forms a film of the subject, or matter to be printed, rendering the same insoluble in any of the lithographic solvents, and resistant to the action of lithographic etching acids.

In the making up of lithographic plates from transfer impressions it has been heretofore the practice to "rub up", or fully cover the subject with ink, "gum up" or apply a coat of gum arabic, then "wash out" or dissolve away the subject with turpentine, after which a coating of asphaltum is applied. The plate is then washed with water to dissolve away the gum arabic leaving the subject only, covered with asphaltum, so that ink will adhere to the subject in the operation of "rolling up" or inking the same.

In using my method a description of which is to follow, the lithographic plates are treated in precisely the same manner as described above, up to and including the operation of "washing out" the subject with turpentine, this leaves bare the surface of the plate previously occupied by the subject. With the plate in this condition a non-actinic solution, presently described, is applied to form a thin even film or coating over the entire plate. After this film is thoroughly dry it is washed with water to dissolve the gum arabic remaining on the plate, that is, the space not occupied by the subject, this also removes the film of solution superimposed on the gum, thus leaving the subject formed by a film of the solution.

The plate is now ready for "rolling up" etching and printing all of which is done in the usual manner and is common practice with those skilled in the art.

The solution used in this method is made in the following manner: 4 oz. shellac previously dissolved in proportion of 1 part shellac, 2 parts alcohol, 4 oz. alcohol, 4 oz. amyl acetate, 4 drams oil of cinnamon, 4 drams oil of lavender, 25 grains methyl violet aniline crystals, mixed in the order named. In the above solution the shellac dissolved in alcohol is used as a base, this base is thinned by the addition of alcohol in the proportion stated; to render the alcohol less volatile and retard the drying of the solution so that it may be spread evenly on the plate, amyl acetate is added. The oils are added to produce the greasy properties necessary to retain the ink used in "rolling up" plates. The dye is added so that the presence of the film may be readily detected.

If it is desired to hasten the preparation of the plate after the solution is applied, a thin coating of asphaltum may be used. This application of asphaltum leaves a surface that will take the ink more readily than the freshly applied solution: it has been found in practice however, that this application is unnecessary after the plate has been prepared a short time.

Lithographic plates, made by the Vandyke process or kindred methods in which the drawing or original subject is placed in contact with a light sensitive film coated plate, are carried through the usual process until it has been "rubbed up" or "rolled up" in inking the subject, after which in using the method, which is the subject of this invention, the plate is "gummed up" with gum arabic, and then "washed out" with turpentine to dissolve away the subject. In this condition the non-actinic solution is applied to the plate and finished as before described.

Lithographic plates, made from photographic negatives in contact with or projected by means of a lens onto a light sensitive film coated plate, are treated in the usual method employed on plates of this kind until the subject stands out clear and sharp in ink, at this point the plate is "gummed up" "washed out", the non-actinic solution is applied and the plate finished in accordance with the method before described.

From the foregoing it will be seen that this method may be used in conjunction with any of the processes of making lithographic plates; for instance in the preparation of plates made from transfer impressions or other processes in which the subjects to be printed is made bare on the plate, my solution forms a film of the subject on the plate and in contact with the plate; and in the processes of making plates from photographic negatives in which a film of the subject is produced on the plate, my solution is superimposed on this film protecting the same. In all cases my method of preparing plates when treated with the solution described has been found in practice to produce a plate that is lasting under severe usage, that will give a maximum amount of service and that eliminates many of the troubles incident to lithographic printing.

In this specification the preferred embodiment of my improvement has been described, but it is to be understood that minor changes may be made within the scope of the appended claims without departing from the spirit or sacrificing any of the advantages thereof.

Having thus described my invention what is claimed is:—

1. In a method of making lithographic plates the step, which consists, after the subject has been washed out of producing on the subject a hardened film, said film being resistant to the action of ink solvents.

2. In a method of making lithographic plates, the step which consists, after the subject has been washed out of superimposing on the subject a hardened film, said film being resistant to the action of ink solvents.

3. In a method of making lithographic plates, the step which consists of applying to the plate, after the subject has been washed out, a non-actinic solution to produce thereon a permanent film of the subject to be printed, said film being resistant to the action of ink solvents and etching acids.

4. In a method of making lithographic plates, the step which consists of applying to the plate after the subject has been washed out a solution consisting of binder, volatiles and oils to produce on the plate a permanent film of the subject, said film being insoluble in ink solvents and resistant to the action of lithographic etching acids.

5. In a method of making lithographic plates the step which consists of applying to the plate after the subject has been washed out, a solution consisting of binder volatiles, oils, and coloring matter, to produce on the plate a permanent and visible film of the subject, said film being insoluble in ink solvents and resistant to the action of etching acids.

6. In a method of making lithographic plates the step which consists after a film of the subject has been produced on the plate and washed out of superimposing on the said subject a permanent film insoluble in ink solvents and resistant to the action of lithographic etching acids.

7. In a method of making lithographic plates, after the operation of washing out the subject, in the usual method, the step which consists of covering the plate with a solution of shellac, alcohol, amyl-acetate oils and coloring matter to produce on the subject a film insoluble in ink solvents and resistant to the action of etching acids.

8. A lithographic solution adapted to form a film on the subject of a lithographic plate, said solution including a base which is insoluble in ink solvents and resistant to the action of etching solutions.

9. A lithographic solution adapted to form a film on the subject of a lithographic plate, said solution including a base which is insoluble in ink solvents and resistant to the action of etching solutions, and a substance to retard the drying of the solution when applied to the plate.

10. A lithographic solution adapted to form a film on the subject of a lithographic plate, said solution including shellac as a base and a substance to retard the drying of the solution when applied to the plate.

11. A lithographic solution adapted to form a film on the subject of a lithographic plate, said solution including a base which is insoluble in ink solvents and resistant to the action of etching solutions, and amylacetate.

12. A lithographic solution adapted to form a film on the subject of a lithographic plate, said solution including shellac, a solvent therefor and amylacetate.

13. A lithographic solution adapted to form a film on the subject of a lithographic plate said solution including a base which is insoluble in lithographic solvents and resistant to the action of etching solutions, a substance to retard the drying of the solution when applied to the plate and an oil which will impart a grease attracting property.

14. A solution for producing on a lithographic plate a film on the subject insoluble in ink solvents and resistant to the action of etching acids, consisting of shellac, alcohol, amylacetate, oil of cinnamon, oil of lavender, and violet crystals.

In testimony that I claim the foregoing as my own, I have hereto affixed my signature in the presence of two witnesses.

DUDLEY P. BARNETTE, Jr.

Witnesses:
LEE H. FALLON,
FRANK B. WOODEM.